United States Patent [19]

Finestone et al.

[11] Patent Number: 5,786,064

[45] Date of Patent: Jul. 28, 1998

[54] PAPER-PLASTIC LAMINATE FABRIC SHEETING

[76] Inventors: Arnold B. Finestone, 2400 Presidential Way, West Palm Beach, Fla. 33401; Gilbert Bloch, 3349 S. Malo Ct., Palm Beach Gardens, Fla. 33410

[21] Appl. No.: 673,139

[22] Filed: Jul. 1, 1996

Related U.S. Application Data

[60] Continuation-in-part of Ser. No. 57,963, May 4, 1993, abandoned, which is a division of Ser. No. 818,544, Jan. 9, 1992, Pat. No. 5,244,702.

[51] Int. Cl.$^6$ ............................. B32B 3/10; B32B 5/02
[52] U.S. Cl. .................. 428/137; 428/105; 428/311.71; 428/316.6; 428/317.7; 428/511; 428/537.5; 428/910
[58] Field of Search ............................ 428/131, 137, 428/311.71, 315.5, 316.6, 317.7, 511, 537.5, 904.4, 910, 105

[56] References Cited

U.S. PATENT DOCUMENTS

| | | | |
|---|---|---|---|
| 4,096,013 | 6/1978 | Lutzmann et al. | 156/272 |
| 4,177,310 | 12/1979 | Steeves | 428/216 |
| 4,254,173 | 3/1981 | Peer, Jr. | 428/204 |
| 4,657,610 | 4/1987 | Komatsu et al. | 428/137 X |
| 4,867,150 | 9/1989 | Gilbert | 428/286 X |
| 5,244,702 | 9/1993 | Finestone et al. | 428/34.3 |
| 5,374,477 | 12/1994 | Lawless et al. | 428/317.3 |
| 5,518,799 | 5/1996 | Finestone et al. | 428/137 |

*Primary Examiner*—Marion E. McCamish
*Assistant Examiner*—Blame R. Copenheaver
*Attorney, Agent, or Firm*—Pennie & Edmonds LLP

[57] ABSTRACT

Apparatus for producing a breathable high strength, paper-plastic film laminate fabric sheeting, capable of being cut and sewn to form medical gowns and other garments. In this apparatus, a web of metallized paper and a web of oriented synthetic plastic film whose inner surface is corona-discharge treated before being coated with a water-based adhesive are concurrently fed in superposed relation into combining rolls to effect cold lamination of the webs to yield a laminate sheeting in which the orientation of the film web is unimpaired. The laminate sheeting emerging from the combining rolls is then foraminated to render the sheeting permeable only to moisture vapor whereby the foraminated sheeting has fabric properties and can be tailored to form garments. To enhance these fabric properties, the foraminated sheeting is embossed to impart greater bulk thereto.

11 Claims, 1 Drawing Sheet

PAPER-PLASTIC LAMINATE FABRIC SHEETING

RELATED APPLICATIONS

This application is a continuation-in-part of application Ser. No. 08/057,963, filed May 4, 1993, which in turn is a division of application Ser. No. 07/815,544 filed Jan. 9, 1992, now U.S. Pat. No. 5,244,702. The disclosures of these related applications are incorporated herein by reference.

BACKGROUND OF INVENTION

1. Field of Invention

This invention relates generally to paper-plastic laminate sheeting, and more particularly to a laminate sheeting in which a paper ply is cold-laminated to an oriented plastic film, the sheeting being foraminated to render it permeable only to moisture vapor, whereby the sheeting possesses properties comparable to those of a non-woven fabric which may be cut and sewn to form garments.

2. Status of Prior Art

In my above-identified copending application Ser. No. 08/057,963 there is disclosed a paper-plastic laminate sheeting of high-strength in which a paper ply is cold-laminated by a water-based adhesive to an oriented synthetic-plastic film ply to produce a laminate sheeting of high strength, for the orientation of the film is not impaired by cold lamination.

The concern of the present invention is with the production of laminate sheeting of the type disclosed in my copending application in which the sheeting is breathable, yet waterproof, so that it then has properties comparable to those of a non-woven fabric and can be cut and sewn to form disposable medical gowns, sportswear, raincoats and other wearable garments.

A non-woven fabric is formed by a coherent sheet of entangled or interbonded fibers. It is made without the fibers first being spun into yarns and then interlaced by weaving, knitting or braiding, or by other means of yarn manipulation. TYVEK is the trademark of the DuPont Company for a non-woven fabric sheeting formed of polyethylene fibers bonded together by heat and pressure to produce a tough, durable sheet structure having minute pores.

The reason TYVEK or other non-woven fabrics are suitable for producing garments is that when the garment is worn, its fine porosity renders it breathable and therefore allows moisture vapor emanating from the wearer of the garment to escape, even though the fabric is effectively waterproof. However TYVEK sheeting is expensive to produce, for it takes complex machinery to produce fine polyethylene fibers and to convert these fibers into a non-woven fabric.

The following patents are of prior art interest in regard to paper-plastic laminates. The British Patent No. 1,569,447 to Steiner, the U.S. Pat. No. 4,254,173 to Peer, and the U.S. Pat. Nos. 4,041,201, 4,351,877, 4,557,971 and 4,554,193 to Williams. Also of prior art interest in regard to the corona-discharge treatment of plastics are the U.S. Pat. Nos. 5,180,599 to Feldmeier et al., and 4,636,427 to Ohno et al.

SUMMARY OF INVENTION

In view of the foregoing, the main object of this invention is to provide an apparatus for producing a paper-film laminate sheeting whose properties are comparable to those of a non-woven or other fabric whereby the sheeting may be cut and sewn to form wearable garments.

More specifically, it is an object of this invention to provide a paper-plastic laminate sheeting which is foraminated throughout its entire surface by a myriad of fine pores that render the sheeting permeable only to moisture vapor whereby the sheeting is breathable, the foraminated sheeting being embossed to increase its bulk and thereby enhance its fabric properties.

Also an object of the invention is to provide an apparatus for carrying out at high speed a preferred technique for producing a paper film laminate sheeting in accordance with the invention.

Still another object of the invention is to provide a foraminated and embossed laminate fabric sheeting of the above type which can be cut and stitched, and may therefore be tailored to produce breathable garments that are comfortable to wear.

Briefly stated, these objects are attained by an apparatus for producing a breathable, high-strength, paper-film laminate fabric sheeting capable of being cut and sewn to form medical gowns, raincoats and other garments. In this apparatus, a web of metallized paper and a web of oriented synthetic plastic film whose inner surface is corona-discharge treated before being coated with a water-based adhesive are concurrently fed in superposed relation into combining rolls to effect cold lamination of the webs to yield a laminate sheeting in which the orientation of the film web is unimpaired.

The laminate sheeting emerging from the combining rolls is then foraminated to render the sheeting permeable only to moisture vapor whereby the foraminated sheeting has fabric properties and can be tailored to form garments. To enhance these fabric properties, the foraminated sheeting is embossed to impart greater bulk thereto.

BRIEF DESCRIPTION OF DRAWINGS

For a better understanding of the invention, as well as other objects and further features thereof, reference is made to the following detailed description to be read in conjunction with the accompanying drawings, wherein.

DESCRIPTION OF INVENTION

Foraminated Paper-Plastic Laminate Fabric Sheeting

Figure 1:
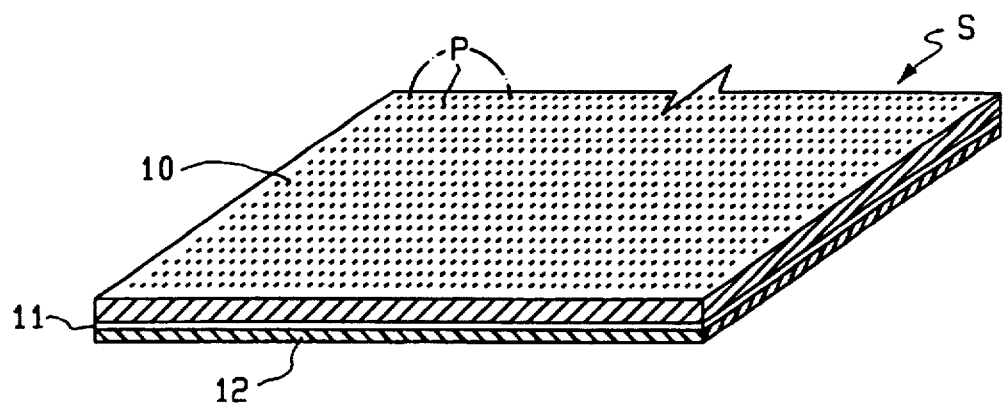
FIG. 1 illustrates a foraminated paper-plastic laminate sheeting in accordance with the invention.

Referring now to FIG. 1, shown therein in an enlarged scale is a flexible paper-plastic film fabric sheeting S in accordance with the invention. Sheeting S includes a paper ply 10 whose gauge, weight and quality are appropriate to the end use for which the sheeting is intended. The outer surface of paper ply 10 is metallized to render it waterproof. Metallization may be effected by aluminum vapor deposition or by sputtering, aluminum being a preferred metal for this purpose.

Cold-laminated by an adhesive layer 11 to the undersurface of paper sheet 10 is a reinforcing ply 12 formed of synthetic plastic film material which is uniaxially or biaxially oriented. Film materials suitable for this purpose are polypropylene, polyethylene, nylon, PVC or a polyester such as MYLAR.

The tensile strength of a synthetic plastic film is substantially increased by orientation which results in molecular orientation of the film material. In the case of biaxial orientation, orientation is in both the longitudinal and transverse directions. This is usually effected by controlled stretching of the unoriented film.

Since paper tends to absorb water in the laminating process, before the paper ply and the film ply are together fed into pressure rolls and subjected to pressure to effect lamination, the inner surface of the film is first coated with the water-based adhesive which does not encounter the inner surface of the paper sheet until these two surfaces meet in the pressure rolls. In this way, the period during which absorption of the adhesive into the interior of the paper sheet can take place is very limited.

Cold lamination of the plies is effected at ambient temperature by a water-based adhesive, such as a polyacrylic copolymer composition having an affinity both for the paper ply and the film ply. Because the water-based adhesive is fluid at ambient temperature and is not a hot melt adhesive, no heat is applied to the biaxially oriented film as it is being laminated to the paper ply. A preferred water-based adhesive is a polyvinyl acetate modified copolymer, which is quick setting.

It is important to note that a biaxially oriented film is heat-sensitive, and that at elevated temperatures the film relaxes and loses its molecular orientation and tensile strength. It is known, for example, that when two sheets of biaxially oriented polyester film are seamed together, using an ultrasonically-activated sealing bar for this purpose which creates internal friction and heat within the film causing the superposed films to soften and fuse, the resultant sealing line is weak, and the sheets then tend to tear along this line. Cold lamination at ambient temperature is, therefore, essential to the present invention in order to produce a laminate sheeting of high tear and burst strength.

It is also to be noted that a synthetic plastic film material, such as polypropylene, is normally not receptive to adhesives, especially water-based adhesives. Hence if one were to apply to the surface of this film a water-based adhesive which is flowable at ambient temperature or at a temperature somewhat above ambient but not at the elevated temperature of a hot melt adhesive, this adhesive will not be adsorbed by the film. Essential to the invention is that the surface of the film be treated so as to render it wettable and hence receptive to adhesives. To this end, the surface is subjected to a corona discharge treatment which enhances its surface energy, as measured in dynes, and thereby renders it wettable to allow for better bonding of the adhesive applied thereto.

It is known to subject the surfaces of plastic film to corona discharge treatment and to produce a roll of this treated film which is held in storage for subsequent lamination to another sheet or ply. We have found, however, that pretreated film has a limited effective life, and that when later laminated, the surfaces of the film are no longer fully active. In producing a paper-film laminate in accordance with the invention, to render its surface wettable, the plastic film, is subjected to corona discharge treatment just prior to lamination, so that the surface is then fully active before adhesive is applied thereto.

And to render the laminate sheeting breathable, the sheeting is foraminated to produce a myriad of minute pores P which are uniformly distributed throughout the entire surface of the sheeting. These pores permit moisture vapor and other gases to escape, but are so minute that liquids cannot pass through the laminate sheeting.

Because the sheeting has a myriad of fine pores it has the properties of a non-woven fabric and can easily be cut and stitched. Thus the sheeting fabric may be tailored to produce disposable medical gowns, as well as field jackets and raincoats which are waterproof yet are breathable, for the sheeting permits only the escape of moisture vapor and the wearer who perspires will be comfortable. The metalization of the paper ply renders it effectively waterproof and also reflective of infrared and ultraviolet energy impinging on the metal.

In practice one may further enhance the strength of the sheeting by interposing between the metallized paper ply and the oriented film ply parallel strands of reinforcing fiberglass.

It is known to provide texturized fabrics having greater bulk than fabrics formed of conventional filamentary yarns. To this end, use is made of crimped yarns whose undulations impart greater bulk or body to the fabric. In a foraminated paper-plastic film sheeting in accordance with the invention, the sheeting is embossed by an embossing roll which impresses a patterned array of fine dimples or indentations therein. These impart greater bulk or body to the sheeting and thereby texturize the sheeting to enhance its fabric properties.

The Laminating Apparatus

Figure 2:
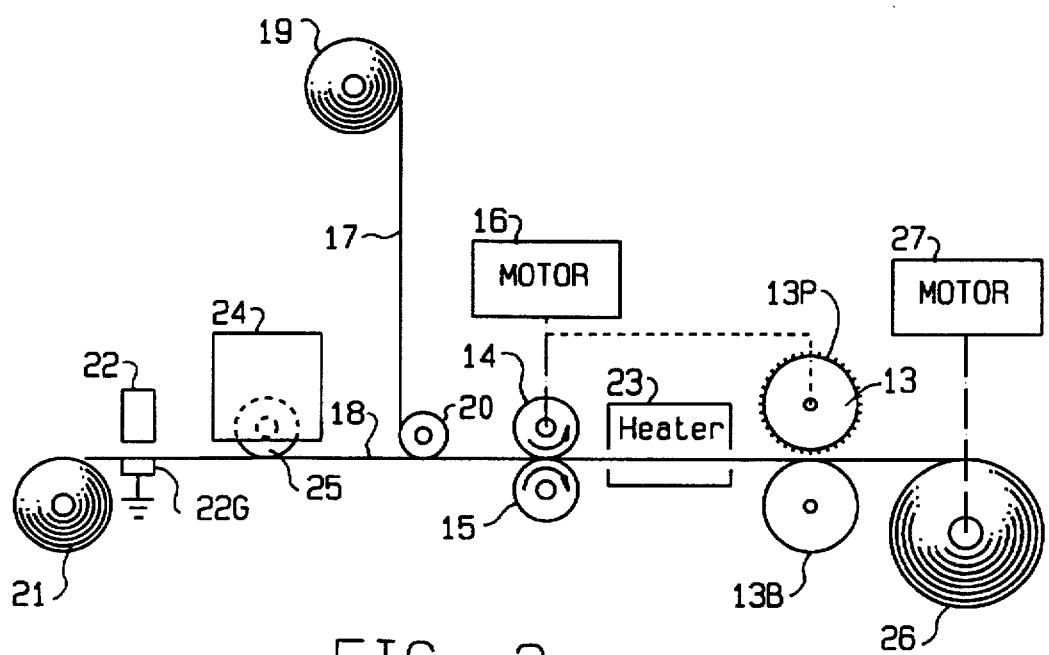
FIG. 2 shows, in schematic form an apparatus adapted to produce the sheeting.

FIG. 2 schematically illustrates a single-stage apparatus for producing a paper-plastic film laminate sheeting in accordance with the invention. The apparatus includes a combining station having a pair of cooperating pressure rolls 14 and 15 driven at high speed by a motor 16. The nip between these rolls is appropriate to the thickness of the webs to be laminated to provide the desired degree of laminating pressure to ensure secure bonding of the webs.

Fed concurrently into the nip of rolls 14 and 15 at the combining station are a web 17 of metallized paper for forming the paper ply 10 of the sheeting, and a web 18 of synthetic plastic film material to form plastic film ply 12. The film which may be of polypropylene, polyethylene, polyester or other suitable material is biaxially oriented. Web 17 is drawn from a paper supply reel 19 supported at an elevated position. Paper web 17 is drawn downwardly from this reel and is guided by an idler roll 20 into a horizontal path leading into the nip of the combining rolls.

Film web 18 is drawn from a film supply reel 21 which is placed at a position to feed film web 18 directly into a horizontal path toward the nip of the combining rolls. Reel 21 is placed well in advance of the combining station in order to expose a fairly long stretch of film web before it enters the combining rolls.

Along this stretch of biaxially oriented film web 18 having a high dielectric constant, is a corona discharge station provided with an electrode 22 which is spaced above the upper surface of the film to create an ionizable air gap therebetween. The film web runs along a ground electrode 22G in vertical alignment with discharge electrode 22. A high-frequency voltage having an amplitude sufficient to produce a corona discharge is applied to electrode 22. The resultant corona discharge which is directed toward the upper surface of the film web, acts to increase the surface energy at the web surface to render it wettable and therefore receptive to adhesives, but it does not affect the molecular orientation of the film.

Intermediate the corona discharge station 22–22G and the combining station is an adhesive applicator 24 having a coating roll 25 which engage the now wettable upper surface of film web 18 and applies thereto the water-based adhesive for laminating the film web to the paper web to form the laminating adhesive layer 11 of the sheeting. This adhesive is preferably a polyvinyl acetate modified copolymer which is quick setting and once set is not soluble in water.

Thus concurrently entering the nip of pressure rolls 14 and 15 of the combining station at ambient temperature are paper web 17 and the adhesive-coated film web 18. These webs are subjected to pressure by pressure rolls 14 and 15, lamination being effected by this action. The laminated webs from the combining station are wound on an output reel 26 driven by a motor 27 whose operation is synchronized with motor 16 driving the pressure rolls, for these motors together serve to draw the webs from their supply reels at a relatively high speed.

Output reel 26 is spaced from combining station 14, 15 so as to provide a long stretch sufficient to permit setting of the adhesive applied to the webs. In order to foraminate the paper-plastic web of sheeting to produce a myriad of tiny pores therein, a needling roll 13 is provided following the combining station. Roll 13 is provided with a circumferential array of fine pins 13P which penetrate the laminate sheeting which is backed by a roll 13B having a covering layer of elastomeric material.

The foraminated web from needling station 13-13B is fed through the cooperating rolls 23 and 23B of an embossing station which impresses an array of fine dimples or indentations in the web to effectively texturize the web and increase its bulk to enhance the fabric properties of the laminate sheeting.

Thus embossing roll 23 may be provided circumferentially with an array of male dies to impress dimples in the web and the cooperating roll 23 may be provided with complementary female dies so that the laminate sheeting compressed between the rolls is embossed by the rolls.

In practice, foramination of the laminate sheeting followed by embossing may be carried out in a separate stage so as to be sure that before foramination takes place, the adhesive is no longer sticky and the laminate is dry. Because the water-based adhesive is absorbed in the paper ply, this ply is rendered water resistant. However, the paper ply is rendered moisture-vapor permeable by the fine pores punctured therein.

A conventional farbric is formed of woven fibers or of non-woven fibers and, in either case, is porous. While a paper-plastic film laminate sheeting lacks the "hand" and properties of a fabric, it gains these properties when the sheeting is forminated, for the resultant fine pores convert the sheeting into a fine netting. And these fabric properties are enhanced when the netting is embossed or texturized and thereby given greater bulk.

While there has been disclosed a preferred embodiment of an apparatus for producing a breathable, texturized paper-film laminate sheeting that is capable of being cut and sewn to form a garment, it is to be understood that many changes may be made in this apparatus without departing from the spirit of the invention.

We claim:

1. A paper-film laminate sheeting comprising:

a paper ply having top and bottom surfaces;

a reinforcing ply of a synthetic plastic film material having top and bottom surfaces;

a water-based adhesive layer for laminating the bottom surface of the paper ply to the top surface of the reinforcing ply; and fiberglass strands between the paper and reinforcing plies to increase the strength of the sheeting;

wherein the top surface of the film is activated by corona discharge treatment prior to contact by the adhesive to render the surface wettable and receptive to the adhesive for increased bonding thereto; and the sheeting includes a plurality of minute pores which are uniformly distributed throughout.

2. The sheeting of claim 1 wherein the film comprises a molecularly oriented plastic material comprising polyethylene, polypropylene, nylon or polyester.

3. The sheeting of claim 1 wherein the adhesive comprises a polyacrylic copolymer or a polyvinyl acetate copolymer.

4. The sheeting of claim 1 wherein the top surface of the paper ply is metallized to render it waterproof.

5. The sheeting of claim 1 which further comprises a texturized surface of dimples or indentations to increase its bulk and enhance its fabric properties.

6. A paper-film laminate sheeting comprising:

a paper ply having top and bottom surfaces;

a reinforcing ply of an oriented synthetic plastic film material having top and bottom surfaces;

a water-based adhesive layer for laminating the bottom surface of the paper ply to the top surface of the reinforcing ply without degrading the orientation of the plastic film material;

wherein the top surface of the film is activated by corona discharge treatment prior to contact by the adhesive to render the surface wettable and receptive to the adhesive for increased bonding thereto; and the sheeting includes a plurality of minute pores which are uniformly distributed throughout.

7. The sheeting of claim 6 wherein the film material comprises polyethylene, polypropylene, nylon or polyester.

8. The sheeting of claim 6 wherein the adhesive comprises a polyacrylic copolymer or a polyvinyl acetate copolymer.

9. The sheeting of claim 6 wherein the top surface of the paper ply is metallized to render it waterproof.

10. The sheeting of claim 6 which further comprises fiberglass strands between the paper and reinforcing plies to increase the strength of the sheeting.

11. The sheeting of claim 6 which further comprises a texturized surface of dimples or indentations to increase its bulk and enhance its fabric properties.

* * * * *